A. C. PAULSMEIER.
AUTOMATIC STUFFING BOX.
APPLICATION FILED MAY 22, 1919.

1,328,190. Patented Jan. 13, 1920.
2 SHEETS—SHEET 1.

INVENTOR
ALBERT C. PAULSMEIER.
BY
ATTORNEYS

UNITED STATES PATENT OFFICE.

ALBERT C. PAULSMEIER, OF ALAMEDA, CALIFORNIA, ASSIGNOR TO BYRON JACKSON IRON WORKS, INC., OF SAN FRANCISCO, CALIFORNIA, A CORPORATION.

AUTOMATIC STUFFING-BOX.

1,328,190.

Specification of Letters Patent. Patented Jan. 13, 1920.

Application filed May 22, 1919. Serial No. 298,965.

*To all whom it may concern:*

Be it known that I, ALBERT C. PAULSMEIER, a citizen of the United States, residing at Alameda, in the county of Alameda and State of California, have invented new and useful Improvements in Automatic Stuffing-Boxes, of which the following is a specification.

This invention relates to an automatic stuffing box and particularly to means for insuring perfect lubrication of the shaft bearings in a deep well pump.

In practically every instance where centrifugal pumps of the deep well type are employed, it is necessary during the installation to submerge the pump a considerable distance, due to the rise and fall of the water in the well caused by intermittent operation of the pump and change in seasons. In a pump that is submerged, it has heretofore been a physical impossibility to keep the water in the well away from the bearing immediately above the top runner of the pump and successive bearings above the same. A stuffing box has never given satisfaction. Because of its inaccessibility, re-packing thereof is prevented, thereby defeating the purpose for which such devices have been designed in the past.

The object of the present invention is to provide means for removing any water that may have accumulated in the shaft tubing or around the bearings mounted therein, the moment the pump is started and for maintaining the tubing and bearings entirely free of water as long as the pump is in operation, thereby permitting a free flow of lubricant to the bearings. Further objects will hereinafter appear.

The invention consists of the parts and the construction, combination and arrangement of parts as hereinafter more fully described and claimed, having reference to the accompanying drawings, in which—

Figure 1:
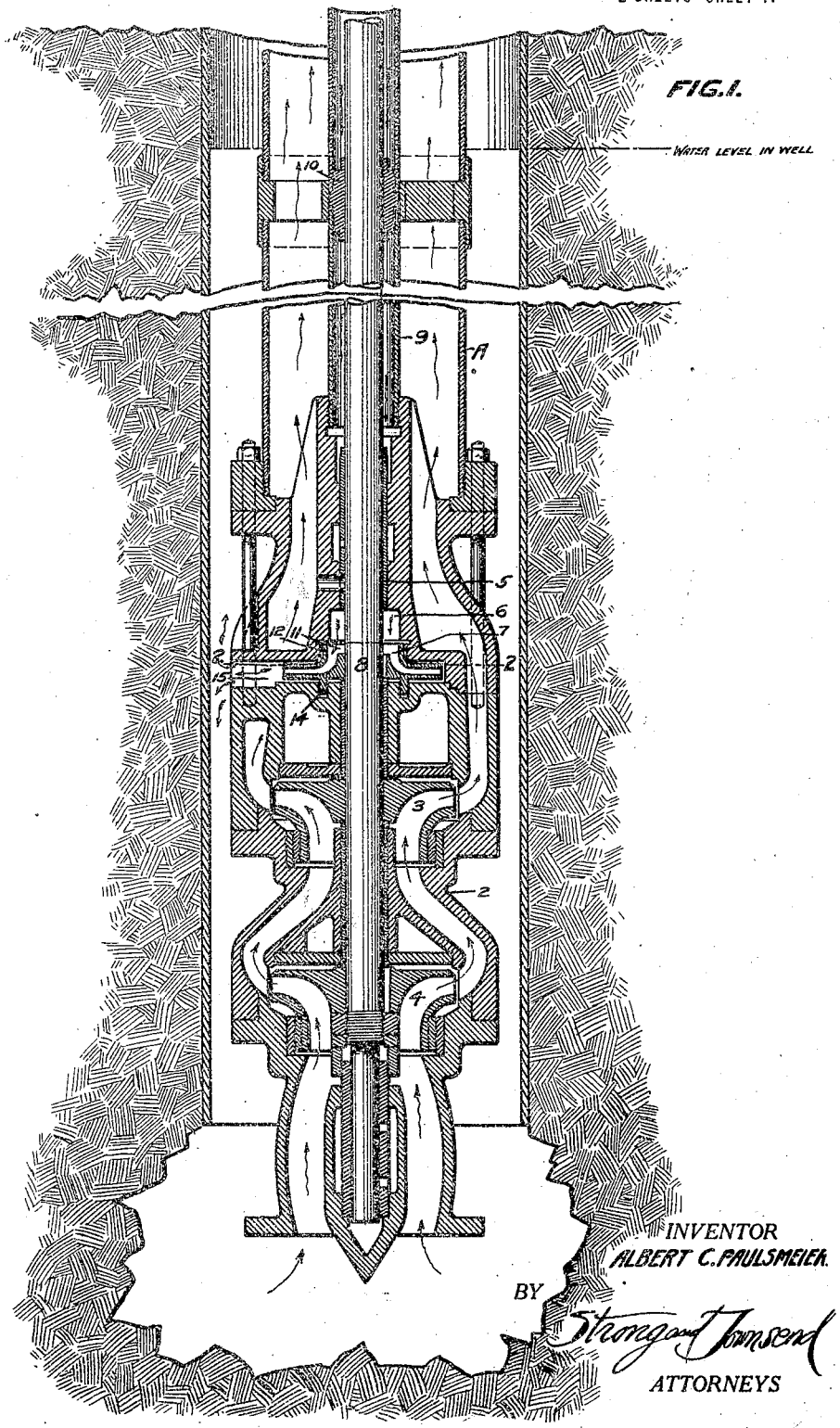
Figure 1 is a sectional view of a deep well and a centrifugal pump mounted therein.
Figure 2:
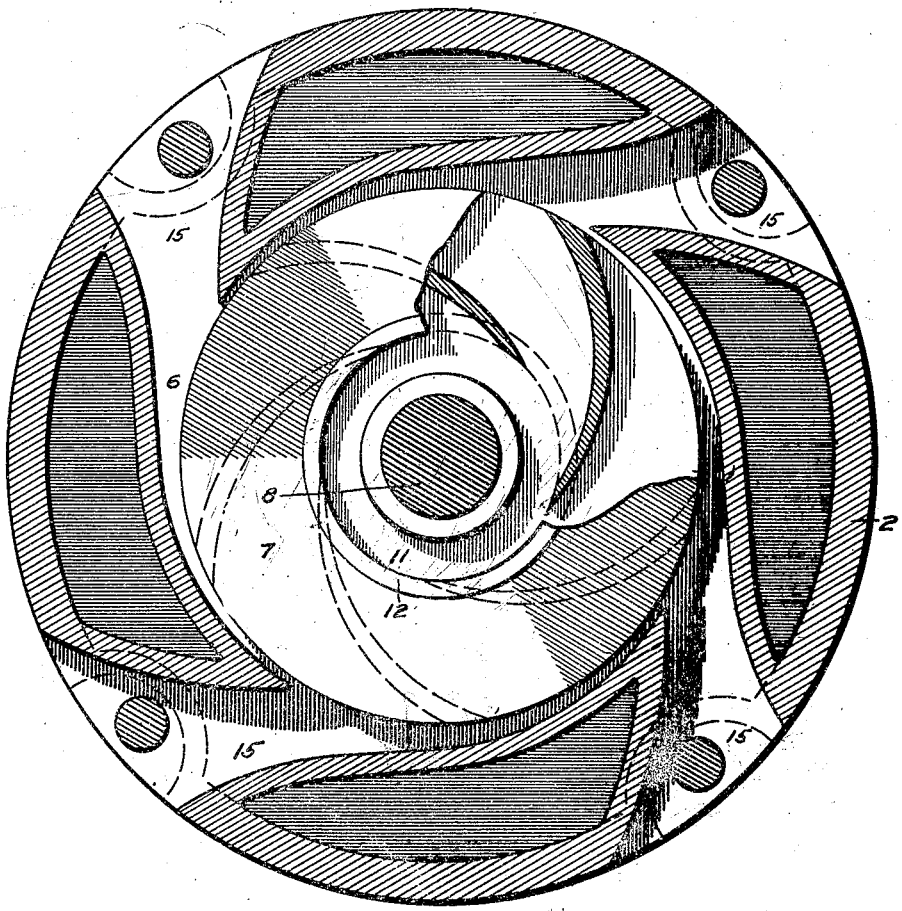
Fig. 2 is a cross section on line 2—2, Fig. 1.

Referring to the drawings in detail, A indicates in general the well casing, on the lower end of which is supported a deep well pump of the centrifugal type, said pump comprising a casing 2 in which is mounted one or more impellers as shown at 3 and 4. Formed in the upper portion of the housing 2 is a bearing 5 and formed directly below said bearing is a chamber 6 in which is mounted an auxiliary runner or impeller 7. Adapted to rotate the impellers and support the same is a vertically positioned driving shaft 8 and inclosing said shaft is a shaft tubing 9 in which is mounted a plurality of bearings 10 for the support of the shaft.

The auxiliary runner employed in the present instance is constructed in any suitable manner. It is mounted on the pump shaft immediately below the bearing or bearings that are protected while the pump is in operation. The auxiliary runner is preferably made in the form known as the "inclosed type" so as to permit lateral motion necessary for setting the main pump impellers in the pump proper in their correct position. The suction inlet, indicated at 11, of the auxiliary runner is on top, there being an annular flange or ring 12 provided to revolve within the body casting, the joint formed being what is generally termed a "running joint". The casing has a cylindrical opening 6 extending upward for some distance, the upper end being closed off by the first bearing 5 that is to be protected. The auxiliary runner is otherwise provided with a solid bottom flange containing a labyrinth ring 14 which rotates within a suitable recess of similar cross section, thus avoiding excess leakage from below. The chamber formed for the reception of the auxiliary runner is provided with a series of discharge openings 15 which communicate with the exterior of the casing 2. The well water may therefore readily enter said ports, which are of any suitable form and can thus pass through the runner, the chamber 6, and will finally enter the shaft tubing 9 through the bearing 5 and bearings placed above the same; that is, the well water will seek its level within the shaft tubing as it is permitted to enter when the pump is at rest. All bearings positioned below the level of the water in the well will thus be submerged when the pump is not operating but upon starting, the water in the well will drop to a more permanent point and the water contained within the shaft tubing will pass downwardly into the chamber containing the auxiliary runner and will therefore be discharged into the well, no matter whether the water in the well is dropped to the level of the auxiliary runner or still stands above the same.

The auxiliary runner is designed to pump against a considerable head. It will therefore almost instantly remove any water that has accumulated around the bearings within the shaft tubing and it will furthermore maintain the bearings and shaft tubing entirely free from water as long as the pump is in operation. The capacity of the auxiliary runner is sufficient to take care of any leakage which may take place between the running joint 12 and the casing and it will also take care of leakage from any other source. Complete removal of water is in this manner obtained and perfect lubrication of the bearings may be maintained as long as the pump is in operation as the oil can freely drain from bearing to bearing during the operation.

The power required to operate the auxiliary runner is so small that it will not interfere with the general efficiency of the pump and as it maintains all bearings in a condition where they may be properly lubricated, it can readily be seen that the general life of the pump after installation will be materially increased. The auxiliary runner in reality serves the function of an automatic stuffing box as it serves the function of preventing admission of water to the shaft tubing when the pump is in operation. It is automatic to this extent only as water is permitted to enter more or less freely when the pump is standing still. Water admitted during this period may rise to any level as it can do no material damage as long as the pump is not in operation.

Having thus described my invention, what I claim and desire to secure by Letters Patent is—

1. The combination with the driving shaft of a pump and the tubing inclosing the same, of means operated by the pump for expelling any leakage water which may enter the shaft tubing during the operation of the pump.

2. The combination with the driving shaft of a pump and the bearings supporting the same, of a shaft tubing inclosing the shaft and the bearings, and means automatically operated by the pump when in operation, for expelling leakage water which may enter the shaft tubing and bearings.

3. The combination with a deep well centrifugal pump and a driving shaft mounted therein, of a shaft tubing connected with the upper end of the pump and inclosing the driving shaft, a series of superposed bearings in the casing and in the shaft tubing, and means within the pump casing for automatically expelling any leakage water which may enter the shaft tubing while the pump is in operation.

4. The combination with a deep well centrifugal pump and a driving shaft mounted therein, of a shaft tubing connected with the upper end of the pump and inclosing the driving shaft, a series of superposed bearings in the casing and in the shaft tubing, an auxiliary impeller mounted on the pump shaft below the shaft tubing, said impeller having its suction end communicating with the shaft tubing so that any leakage water entering the same may be expelled during the operation of the pump.

5. The combination with a deep well centrifugal pump and a driving shaft mounted therein, of a shaft tubing connected with the upper end of the pump and inclosing the driving shaft, a series of superposed bearings in the casing and in the shaft tubing, a chamber formed in the pump below the lowermost bearing, and an impeller mounted on the pump shaft within said chamber, said impeller having its suction end communicating with said chamber to automatically expel any leakage water that may enter the shaft tubing and bearings during the operation of the pump.

6. The combination with a deep well centrifugal pump and a driving shaft mounted therein, of a shaft tubing connected with the upper end of the pump and inclosing the driving shaft, a series of superposed bearings in the casing and in the shaft tubing, a chamber formed in the pump below the lowermost bearing, an impeller mounted on the pump shaft within said chamber, said impeller having its suction end communicating with said chamber to automatically expel any leakage water that may enter the shaft tubing and bearings during the operation of the pump, and a series of discharge ports formed in the pump casing in alinement with the impeller to permit leakage water to be freely discharged.

In testimony whereof I have hereunto set my hand in the presence of two subscribing witnesses.

ALBERT C. PAULSMEIER.

Witnesses:
E. L. OSBORN,
H. J. ELLEN.